(12) United States Patent
Blanchard

(10) Patent No.: US 8,109,175 B2
(45) Date of Patent: Feb. 7, 2012

(54) TRANSMISSION BETWEEN A DRIVE ELEMENT AND WHEELS AND VEHICLE COMPRISING SUCH A TRANSMISSION

(75) Inventor: Robert Blanchard, Le Château d'Olonne (FR)

(73) Assignee: France Reducteurs, Les Herbiers (FR)

( * ) Notice: Subject to any disclaimer, the term of this patent is extended or adjusted under 35 U.S.C. 154(b) by 901 days.

(21) Appl. No.: 12/142,822

(22) Filed: Jun. 20, 2008

(65) Prior Publication Data

US 2009/0078085 A1 Mar. 26, 2009

(30) Foreign Application Priority Data

Jun. 20, 2007 (FR) ...................................... 07 04380

(51) Int. Cl.
*F16H 48/12* (2006.01)

(52) U.S. Cl. ........................................... 74/650; 74/333

(58) Field of Classification Search .................... 74/325, 74/329, 331, 333, 650
See application file for complete search history.

(56) References Cited

U.S. PATENT DOCUMENTS

| | | | |
|---|---|---|---|
| 3,796,275 A * | 3/1974 | Bouyer | 180/6.4 |
| 4,416,167 A | 11/1983 | Stacy | |
| 5,195,933 A * | 3/1993 | Thoma et al. | 475/206 |
| 6,182,784 B1 * | 2/2001 | Pestotnik | 180/376 |
| 6,363,630 B1 * | 4/2002 | Ziegler | 37/257 |
| 6,497,593 B1 * | 12/2002 | Willis | 440/8 |
| 6,789,441 B2 | 9/2004 | Blanchard | |
| 2007/0114076 A1 * | 5/2007 | Osborne | 180/19.3 |

FOREIGN PATENT DOCUMENTS

| | | |
|---|---|---|
| FR | 2 829 091 A | 3/2003 |
| WO | 2004/031597 A1 | 4/2004 |

* cited by examiner

*Primary Examiner* — Ha D. Ho

(74) *Attorney, Agent, or Firm* — Young & Thompson

(57) ABSTRACT

A transmission between a drive element and a drive shaft of the wheels of a self-propelled tractor vehicle includes generally housed at least partially inside a box, a progressive friction clutch that includes at least one rotary driving element and two driven elements that are carried by the drive shaft and are integral in rotation therewith. These driving and driven elements are, under the action of a control element, brought into variable-tightening support contact to obtain a variation of the torque transmitted to the shaft. The drive shaft is formed by two half-shafts mounted to rotate freely relative to one another, each able to be connected, directly or indirectly, to one of the wheels of the vehicle, whereby each of the driven elements is carried by one of the two half-shafts.

20 Claims, 2 Drawing Sheets

TRANSMISSION BETWEEN A DRIVE ELEMENT AND WHEELS AND VEHICLE COMPRISING SUCH A TRANSMISSION

BACKGROUND OF THE INVENTION

This invention relates in a general manner to the transmissions between a drive element and the wheels of a self-propelled tractor vehicle.

It relates in particular to a transmission between a drive element and the wheels of a self-propelled tractor vehicle, in particular with an accompanying driver walking behind the vehicle, such as a lawn mower, whereby the transmission comprises at least—generally housed at least partially inside a box—a drive shaft of the wheels and a progressive friction clutch of the type that comprises at least one rotary driving element and two driven elements that are carried by the drive shaft and are integral in rotation with the latter, whereby these driving and driven elements are, under the action of a control element, brought into variable-tightening support contact to obtain a variation of the torque that is transmitted to the shaft. The invention also relates to a vehicle that comprises such a transmission.

DESCRIPTION OF THE RELATED ART

The document FR 2829091 provides a transmission as described above. However, it is observed that such a transmission does not allow the wheels to turn at different speeds, in particular during cornering. In other words, the design of this transmission does not offer any differential function.

It is possible to provide for the addition of a standard differential system of the type that comprises two sun gears and two pinion gears. However, the result is to make the vehicle mechanically complex, as well as to increase the cost of the unit overall.

In addition, it is observed that with such a standard differential system, when one of the driving wheels rests on a gripping surface, while the other driving wheel rests on a non-gripping surface, such as ice, the drive torque is completely transferred to the non-gripping wheel while the gripping wheel does not benefit from any drive torque.

The user should therefore provide a high force to put the two wheels of the lawn mower on gripping surfaces.

SUMMARY OF THE INVENTION

One object of this invention is therefore to propose a transmission of the above-mentioned type whose design makes it possible for wheels to turn at different speeds, in particular when cornering, while ensuring the transmission of a minimum drive torque to the two driving wheels regardless of the state of the surface on which these two wheels rest.

For this purpose, the invention relates to a transmission between a drive element and the wheels of a self-propelled tractor vehicle, in particular with an accompanying driver walking behind the vehicle, such as a lawn mower, whereby the transmission comprises—generally housed at least partially inside a box—a wheel drive shaft and a progressive friction clutch of the type that comprises at least one rotary driving element and two driven elements that are carried by the drive shaft and are integral in rotation with the latter, whereby these driving and driven elements are, under the action of a control element, brought into variable-tightening support contact to obtain a variation of the torque that is transmitted to the shaft, characterized in that the drive shaft is formed by two half-shafts that are mounted to rotate freely relative to one another, and are each able to be connected, directly or indirectly, to one of the wheels of the vehicle to be driven, whereby each of the driven elements is carried by one of the two half-shafts.

Owing to such a design of the transmission according to the invention, the drive half-shafts are able to be driven at different speeds even in the engaged state, i.e., even when the driven and driving elements are in support contact by friction.

The transmission according to the invention thus acts, on the one hand, as a reduction gear and clutch, and, on the other hand, as a "differential," in that the wheels can turn at different speeds in particular when cornering. Actually, the transmission box plays an equivalent role to that of a differential, in that the wheels can turn at different speeds when cornering owing to the fact that the drive shaft of the wheels is no longer produced in the form of a shaft of a single support but consists of two half-shafts that are each designed to allow the driving of a wheel.

Primarily, the differential that is formed by the progressive friction clutch and the two half-shafts is a limited-slip differential. Actually, relative to a standard differential with pinion gears and sun gears, the driven elements can slip by friction with the driving element, which makes it possible to limit the speed and torque difference that may appear between the driven elements and therefore between the wheels. The result is that each driven element preserves a minimum drive torque because of the friction with the driving element, regardless of the gripping state of the surface on which the wheel rests in connection with the driven element. The driving of the vehicle that is equipped with such a transmission is thus easier, in particular when cornering.

Such a transmission is also characterized by its simplicity of production.

According to a first advantageous characteristic of the invention, the two half-shafts that rotate freely relative to one another are kept aligned by means of a connecting element. Preferably, the two half-shafts each comprise, at their end rotated toward the other half-shaft, a bore in which said connecting element is shrunk-on.

According to another advantageous characteristic of the invention, the driven elements are cones that are hollowed-out centrally to be able to be slipped onto each half-shaft.

According to another advantageous characteristic of the invention, the central hollowing-out of each cone is provided with grooves that can work with grooves of the half-shaft that carries said cone so as to make said cone and the corresponding half-shaft integral in rotation.

According to another advantageous characteristic of the invention, the driving element is inserted between the two driven elements.

According to another advantageous characteristic of the invention, the driving element assumes the shape of a gear-wheel that is equipped with an axial bore that has two conical bearings that work respectively by controlled support contact with the two cones. Preferably, the conical bores have surfaces that diverge from the center of the bore toward the outside of the bore.

According to another advantageous characteristic of the invention, the cones are housed in the axial bore of the gear-wheel.

According to another advantageous characteristic of the invention, the input control element in support contact with the driven elements and the driving element comes in the form of a control element, such as a fork that can be shifted angularly and that exerts, during its angular shift, an axial compression stress of the stack formed by the driven elements and the driving element.

According to another advantageous characteristic of the invention, one of the walls of the box forms a stop for axially stopping the stack formed by the driven elements and the driving element in a coaxial arrangement on said drive shaft.

The invention also relates to a self-propelled tractor vehicle, in particular with an accompanying driver walking behind the vehicle, such as a lawn mower, whereby said vehicle comprises a transmission between a drive element and the wheels of the vehicle, whereby said transmission comprises—generally housed at least partially inside a box—at least one drive shaft of the wheels and a progressive friction clutch of the type that comprises at least one rotary driving element and two driven elements that are carried by the drive shaft and are integral in rotation with the latter, whereby these driving and driven elements are, under the action of a control element, brought into variable-tightening support contact to obtain a variation of the torque that is transmitted to the shaft, characterized in that said transmission is consistent with the one that is described above.

BRIEF DESCRIPTION OF THE DRAWINGS

The invention will be better understood from reading the following description of embodiments, with reference to the accompanying drawings in which.

DESCRIPTION OF THE PREFERRED EMBODIMENTS

As mentioned above, the transmission, object of the invention, is more particularly designed to be applied to wheeled vehicles, in particular with a walking driver. These vehicles are generally called pushed vehicles. In this case, the driver acts on a driving element of the vehicle, such as a set of handlebars.

Figure 1:
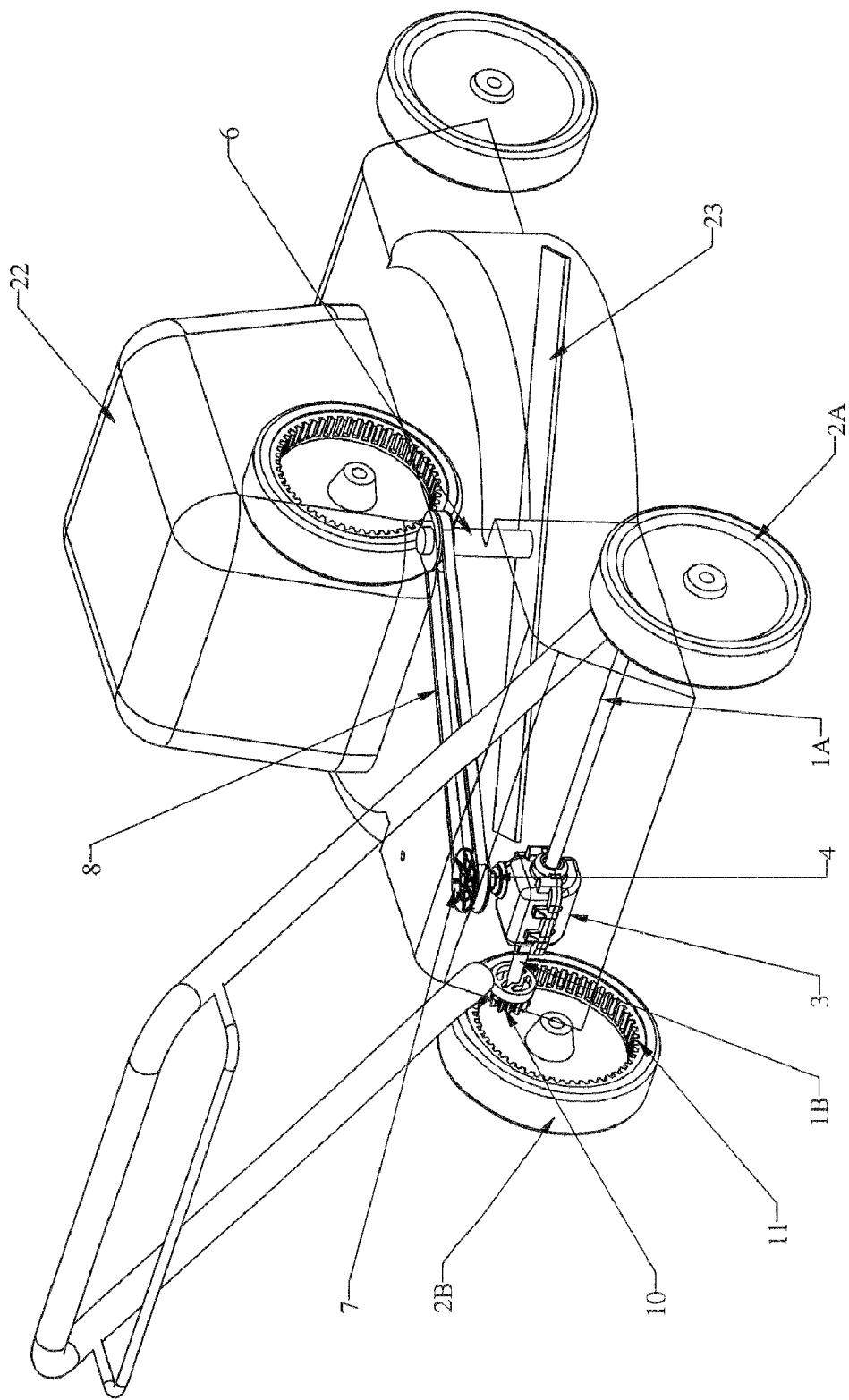
FIG. 1 shows a general diagrammatic outline of a wheeled vehicle, in this case a lawn mower, equipped with a transmission according to the invention.

FIG. 1 shows the application of such a transmission to a lawn mower. This lawn mower comprises a wheeled chassis, whereby the rear wheels of this chassis are shown at 2A, 2B in FIG. 1. An engine 22 is installed on the vehicle. The engine output shaft 6 carries, on the one hand, a cutting blade 23 and, on the other hand, a driving pulley that is connected by means of a belt 8 to a driven pulley 7. This driven pulley 7 is itself mounted on an engine input shaft 4 that is designed to be housed at least partially in a box 40 of the transmission.

This transmission comprises, housed at least partially inside the box 40, a progressive friction clutch. This progressive friction clutch comprises a rotary driving element 30 and two driven elements 5A, 5B that are carried by a drive shaft 1 and are integral in rotation with the latter. These driving elements 30 and driven elements 5A, 5B are under the action of a control element 20, brought into variable-tightening support contact to obtain a variation of the torque that is transmitted to the shaft 1.

In a manner that is characteristic of the invention, the drive shaft 1 is formed by two half-shafts 1A, 1B that are mounted to rotate freely relative to one another. Each of these two half-shafts is connected, as described below, to one of the wheels 2A, 2B of the vehicle to be driven. Each of the driven elements 5A, 5B is carried by one of the two half-shafts 1A, 1B.

Owing to such a design of the transmission according to the invention, the drive half-shafts 1A, 1B may be driven at various speeds even in the engaged state, i.e., even when the driven elements 5A, 5B and the driving elements 30 are in support contact by friction.

Each drive shaft 1A, 1B of a wheel 2A or 2B of a pair of wheels of the vehicle, also called half-shaft 1A or 1B, has—inside the box 40—a hollowed-out end 9A, 9B, or bore, engaged, freely rotating, on a connecting element, here a shaft 3. Thus, the two half-shafts 1A, 1B that are freely rotating relative to one another are kept aligned by means of this connecting shaft 3.

The driving element 30 is positioned, inside the box 40, coaxially to the two drive half-shafts 1A, 1B of wheels 2A, 2B at the level of the connecting zone of the two half-shafts. In particular, the driving element 30 is inserted between the two driven elements 5A, 5B.

The driving element 30 is designed to actuate each of the two drive half-shafts 1A, 1B of a wheel 2A, 2B of the vehicle.

Figure 2:
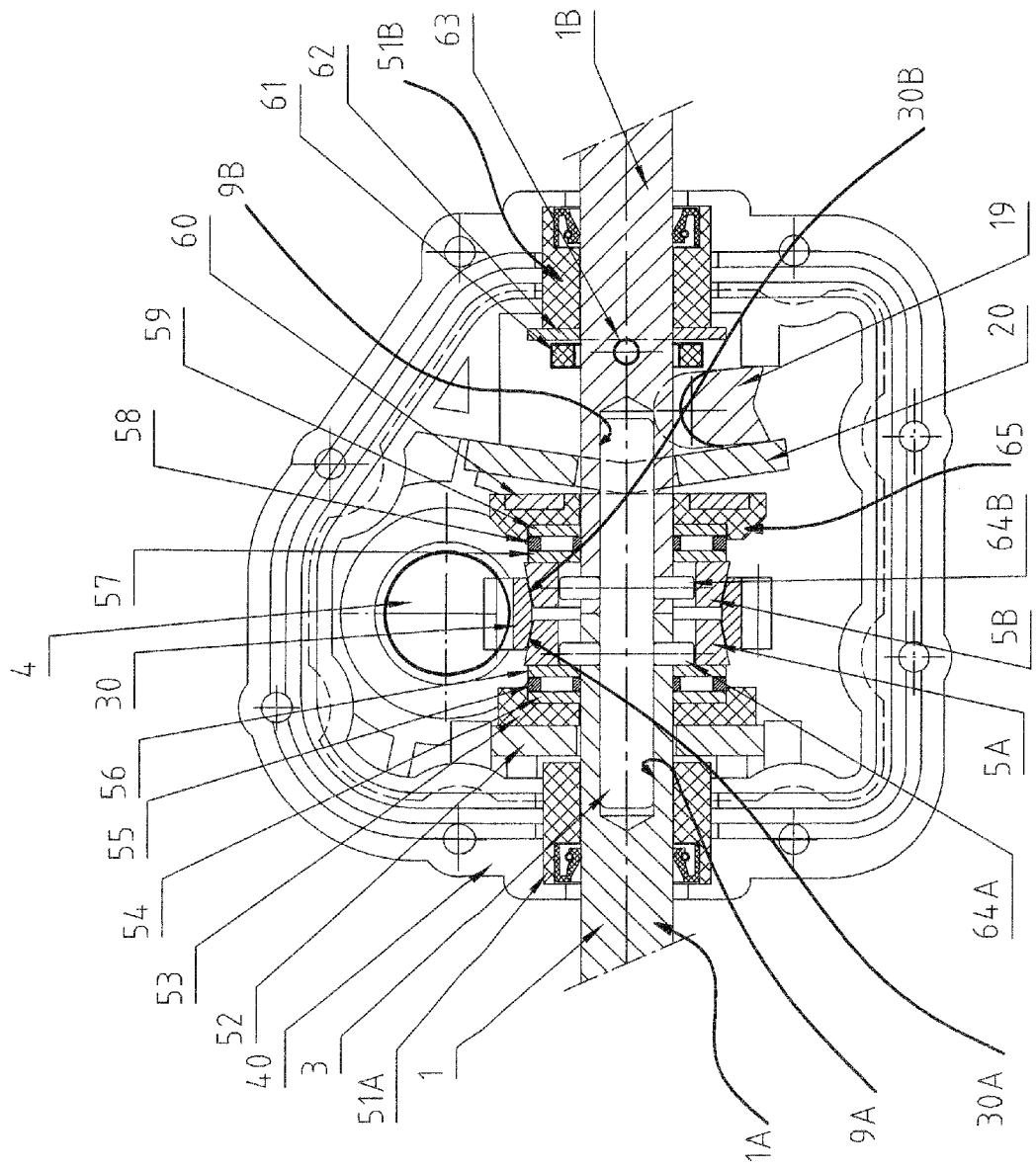
FIG. 2 is an axial cutaway view of the transmission according to the invention.

The driven elements 5A, 5B are cones 5A, 5B that are hollowed out centrally to be able to be slipped onto each half-shaft 1A, 1B. The driving element 30 and the driven elements 5A, 5B are mounted freely in translation relative to the two half-shafts 1A, 1B. Here, the driven elements, i.e., the cones 5A, 5B, are kept integral in rotation with the half-shaft that carries them via pins 64A, 64B (FIG. 2). As a variant, it is possible to provide that the central recess of each side 5A, 5B be provided with grooves that can work with the grooves of the half-shaft 1A, 1B that carries said cone 5A, 5B, so as to make said cone 5A, 5B and the corresponding half-shaft 1A, 1B integral in rotation.

The driving element 30 assumes the form of a gearwheel 30 that is equipped with an axial bore that has two conical bearings 30A, 30B. These conical bearings 30A, 30B respectively work, by controlled support contact, with the two cones 5A, 5B. The conical bearings 30A, 30B have surfaces that diverge from the center of the bore toward the outside of the bore.

In particular, the two cones 5A, 5B are arranged inside the axial bore of the gearwheel 30 to become engaged—during their controlled movement—with the conical bearings 30A, 30B of the tangent wheel, to transmit a drive torque to each of the two drive half-shafts 1A, 1B of the wheels 2A, 2B.

In a general manner, the control element 20 can be shifted angularly inside the transmission box 40 to ensure the tightening or the loosening of driving elements 30 and driven elements 5A, 5B. In particular, the control element 20 assumes the shape of a fork 20 and during its angular shift, it exerts an axial compression stress of the stack formed by the driven elements 5A, 5B and the driving element 30. As shown in FIG. 2, one of the walls of the box 40 forms a stop for axially stopping the stack that is formed by the driven elements 5A, 5B and the driving element 30.

The angular shift of this control element is itself controlled by an eccentric control shaft 19, also called a camshaft. As shown in FIG. 2, a portion of the fork is supported on a wall of the box 40 when the camshaft rests on this fork, which makes it possible for the fork to be shifted angularly relative to the shaft of the two half-shafts 1A, 1B.

This camshaft 19 is connected by a transmission for moving to an attached control element (not shown) that is positioned in immediate proximity to or on the driving element of the vehicle.

When the command is given to bring the driven and driving elements together based on the value of the applied control stress, the type of clutch that is retained, namely a progressive friction clutch, makes possible, in addition to the clutch and differential functions, a variation of the speed for driving in rotation with each drive half-shaft of the wheels of the vehicle.

As shown in FIG. 2, the two half-shafts are mounted in the box 40 by means of bearings 51A, 51B. The following stack of elements is also provided between the bearing 51A and the cone 5A, viewed from left to right in FIG. 2: a reaction plate 52, a simple centering crosspiece 53, a stationary washer 54, a thrust needle bearing 55, and a rotating washer 56. Likewise, the following stack of elements is provided between the control element 20 and the cone 5B, viewed from right to left in FIG. 2: a thrust washer 60, a double-centering crosspiece 65, a stationary washer 59, a thrust needle bearing 58, and a rotating washer 57. Finally, between the bearing 51B and the control element 20, a washer 62 that is combined with a stopping pin 63 and a pin mask 61 is provided.

At the ends of the drive shafts 1A, 1B of the wheels, projecting from the transmission box 40, in each case a pinion 10 that is designed to engage with a pinion 11 that is carried by each wheel 2A, 2B of the vehicle (FIG. 1) is placed. Quite obviously, other transmission means of the movement of the drive shaft 1A, 1B of wheel 2A, 2B to the wheel 2A, 2B can be provided without exceeding the scope of the invention.

Preferably, the two driven elements, here the cones 5A, 5B as well as the associated conical bearings 30A, 30B, are of identical design.

The box 40 generally consists of two half-shells assembled by a joint plane, whereby the connection between the two half-shells is carried out by screwing and/or gluing. The box 40 is generally made of synthesis material.

The operation of the transmission according to the invention is described below.

As recalled above, the driving in rotation of the two half-shafts 1A and 1B is carried out by bringing cones 5A, 5B into contact with the conical bearings 30 of the gearwheel 30, which is itself driven in rotation by the drive element 22.

More specifically, the driving in rotation of the gearwheel 30 is obtained after tension of the belt 8 that allows the transmission of the movement of the driving pulley to the driven pulley and consequently the transmission of a movement in rotation to the engine input shaft 4, such as an endless screw, which itself transmits its movement to the gearwheel 30 that is in contact with the input shaft 4.

Bringing cones 5A, 5B into support contact with the conical bearings 30A, 30B is controlled by the control element 20. To do this, the driver actuates the attached control element that is located close to the driving element, which controls the pivoting of the camshaft 19 and thus the angular shift of the fork 20. The fork 20 then exerts an axial compression stress on the stack that is formed by the driven elements 5A, 5B and the driving element 30.

More specifically, under the stress of the fork, the cone 5B is shifted axially by the fork against the gearwheel 30 that is itself moved against the cone 5A. The axial shift of the stack is stopped by the wall of the box that acts as a stop.

The surfaces of the cones then work by support contact with the conical bearings 30A, 30B. Because of the friction forces between the cones and the conical bearings, the two half-shafts 1A, 1B and therefore the wheels are driven in rotation.

Whereby the clutch that is formed by the cones 5A, 5B and the conical bearings 30A, 30B, which are in frictional contact, and the two half-shafts 1A, 1B are separate and not integral in rotation, the wheels 2A, 2B can turn at different speeds, even when the cones and the conical bearings are engaged. In addition, because the cones 5A, 5B can continuously slip on the conical bearings 30A, 30B in the engaged state, each wheel 2A, 2B is able to receive a minimum drive torque regardless of the gripping state of the surfaces on which the wheels rest. The driving of the vehicle, and in particular the cornering, is thus facilitated.

This invention is in no way limited to the embodiment that is described and shown, but one skilled in the art will know to provide any variant in keeping with its spirit.

As a variant, in the entire foregoing, it is possible to provide these cones, and the associated conical bearings are replaced by other friction elements such as disks or skids.

The invention claimed is:

1. A transmission between a drive element (22) and wheels (2A, 2B) of a self-propelled tractor vehicle, comprising:
   housed at least partially inside a box (40), a drive shaft (1) of the wheels and a progressive friction clutch that comprises at least one rotary driving element (30) and two driven elements (5A, 5B) that are carried by the drive shaft (1) and are integral in rotation with the drive shaft, whereby said at least one driving element (30) and said driven elements (5A, 5B) are, under the action of an input control element (20), brought into variable-tightening support contact to obtain a variation of the torque that is transmitted to the shaft (1),
   wherein the drive shaft (1) is formed by two half-shafts (1A, 1B) that are mounted to rotate freely relative to one another, and are each able to be connected, directly or indirectly, to one of the wheels (2A, 2B) of the vehicle to be driven, whereby each of the driven elements (5A, 5B) is carried by one of the two half-shafts (1A, 1B).

2. The transmission according to claim 1, wherein the two half-shafts (1A, 1B) that rotate freely relative to one another are kept aligned by means of a connecting element (3).

3. The transmission according to claim 2, wherein the two half-shafts (1A, 1B) each comprises, at their end rotated toward the other half-shaft (1A, 1B), a bore (9A, 9B) in which said connecting element (3) is shrunk-on.

4. The transmission according to claim 1, wherein the driving element (30) is inserted between the two driven elements (5A, 5B).

5. The transmission according to claim 1, wherein the driven elements (5A, 5B) are cones (5A, 5B) that are centrally hollowed-out to be able to be slipped onto each of said half-shaft (1A, 1B).

6. The transmission according to claim 5, wherein a central recess of each cone (5A, 5B) is provided with grooves that can work with grooves of the half-shaft (1A, 1B) that carries said cone (5A, 5B), so as to make said cone (5A, 5B) and the corresponding half-shaft (1A, 1B) integral in rotation.

7. The transmission according to claim 5, wherein the driving element (30) assumes the shape of a gearwheel (30) that is equipped with an axial bore that has two conical bearings (30A, 30B) that work respectively by support contact that is controlled with the two cones (5A, 5B).

8. The transmission according to claim 7, wherein the conical bearings (30A, 30B) have surfaces that diverge from the center of the bore toward the outside of the bore.

9. The transmission according to claim 7, wherein the cones (5A, 5B) are housed in the axial bore of the gearwheel (30).

10. The transmission according to claim 1, wherein the input control element (20), in support contact with the driven elements (5A, 5B) and the driving element (30), can be shifted angularly and exerts, during its angular shift, an axial compression stress of a stack that is formed by the driven elements (5A, 5B) and the driving element (30).

11. The transmission according to claim 1, wherein one of the walls of the box (40) forms a stop for axially stopping a stack that is formed by the driven elements (5A, 5B) and the driving element (30) in a coaxial arrangement on said drive shaft.

12. A self-propelled tractor vehicle, comprising:
a transmission between a drive element (22) and wheels (2A, 2B) of the vehicle, whereby said transmission comprises at least, generally housed at least partially inside a box (40), a drive shaft (1) of the wheels and a progressive friction clutch that comprises at least one rotary driving element (30) and two driven elements (5A, 5B) that are carried by the drive shaft (1) and are integral in rotation with the drive shaft (1), whereby said at least one rotary driving element (30) and said driven elements (5A, 5B) are, under the action of a control element (20), brought into variable-tightening support contact to obtain a variation of the torque that is transmitted to the shaft (1), wherein said transmission is in keeping with claim 1.

13. The transmission according to claim 2, wherein the driving element (30) is inserted between the two driven elements (5A, 5B).

14. The transmission according to claim 3, wherein the driving element (30) is inserted between the two driven elements (5A, 5B).

15. The transmission according to claim 2, wherein the driven elements (5A, 5B) are cones (5A, 5B) that are centrally hollowed-out to be able to be slipped onto each of said half-shaft (1A, 1B).

16. The transmission according to claim 3, wherein the driven elements (5A, 5B) are cones (5A, 5B) that are centrally hollowed-out to be able to be slipped onto each of said half-shaft (1A, 1B).

17. The transmission according to claim 4, wherein the driven elements (5A, 5B) are cones (5A, 5B) that are centrally hollowed-out to be able to be slipped onto each of said half-shaft (1A, 1B).

18. The transmission according to claim 6, wherein the driving element (30) assumes the shape of a gearwheel (30) that is equipped with an axial bore that has two conical bearings (30A, 30B) that work respectively by support contact that is controlled with the two cones (5A, 5B).

19. The transmission according to claim 8, wherein the cones (5A, 5B) are housed in the axial bore of the gearwheel (30).

20. The transmission according to claim 2, wherein the input control element (20), in support contact with the driven elements (5A, 5B) and the driving element (30), can be shifted angularly and exerts, during its angular shift, an axial compression stress of a stack that is formed by the driven elements (5A, 5B) and the driving element (30).

\* \* \* \* \*